(12) United States Patent
Marinov

(10) Patent No.: US 9,325,853 B1
(45) Date of Patent: Apr. 26, 2016

(54) EQUALIZATION OF SILENCE AUDIO LEVELS IN PACKET MEDIA CONFERENCING SYSTEMS

(71) Applicant: ATLASSIAN PTY LTD, Sydney (AU)

(72) Inventor: Lyubomir Metodiev Marinov, Austin, TX (US)

(73) Assignee: ATLASSIAN PTY LTD, Sydney (AU)

( * ) Notice: Subject to any disclaimer, the term of this patent is extended or adjusted under 35 U.S.C. 154(b) by 0 days.

(21) Appl. No.: 14/864,745

(22) Filed: Sep. 24, 2015

(51) Int. Cl.
*G10L 25/78* (2013.01)
*H04M 3/56* (2006.01)
*H04L 29/06* (2006.01)
*G10L 19/012* (2013.01)

(52) U.S. Cl.
CPC ............ *H04M 3/568* (2013.01); *G10L 19/012* (2013.01); *G10L 25/78* (2013.01); *H04L 65/403* (2013.01); *H04L 65/608* (2013.01); *H04L 69/22* (2013.01)

(58) Field of Classification Search
CPC ... H04M 3/568; H04L 65/608; H04L 65/403; H04L 69/22; G10L 19/012; G10L 25/78
See application file for complete search history.

(56) References Cited

U.S. PATENT DOCUMENTS

| | | | | |
|---|---|---|---|---|
| 5,724,416 | A * | 3/1998 | Foladare | H04M 3/40 370/260 |
| 6,804,340 | B2 * | 10/2004 | Howard | H04L 29/06027 379/201.01 |
| 2001/0014857 | A1 * | 8/2001 | Wang | G10L 25/78 704/231 |
| 2002/0120440 | A1 * | 8/2002 | Zhang | G10L 25/78 704/215 |
| 2003/0161276 | A1 * | 8/2003 | Lundberg | H04M 3/568 370/267 |
| 2003/0161314 | A1 * | 8/2003 | Flowers | H04M 3/56 370/394 |
| 2003/0220971 | A1 * | 11/2003 | Kressin | H04L 12/1822 709/204 |
| 2004/0199933 | A1 * | 10/2004 | Ficco | H04N 5/602 725/151 |
| 2008/0312923 | A1 * | 12/2008 | Crinon | H04M 3/569 704/246 |
| 2009/0296802 | A1 * | 12/2009 | Ermolayev | H04L 1/0054 375/233 |
| 2012/0120797 | A1 * | 5/2012 | Hahn | H04J 3/0632 370/230 |

FOREIGN PATENT DOCUMENTS

WO    WO 2014/158193    *   3/2013    ............ G10L 25/78

OTHER PUBLICATIONS

J. Lennox, "A Real-time Transport Protocol (RTP) Header Extension for Client-to-Mixer Audio Level Indication", Internet Engineering Task Force (IETF), Dec. 2011.*

Volfin et al., "Dominant Speaker Identification for Multipoint Videoconferencing", Computer Speech and Language 27 dated 2013, pp. 895-910.

(Continued)

*Primary Examiner* — Jialong He
(74) *Attorney, Agent, or Firm* — Hickman Palermo Becker Bingham LLP

(57) ABSTRACT

A method for equalizing silence levels includes receiving, at a selective forwarding unit (SFU), media protocol packets corresponding to an audio stream, wherein each particular media protocol packet comprises a packet header comprising an audio level value identifying an audio level of an audio sample that is carried in that particular media protocol packet. The method further includes equalizing, by the SFU, a silence level of the audio stream by determining a minimum audio level of the audio stream over a time period using the audio level from each of a subset of the media protocol packets corresponding to the time period, setting the silence level for the audio stream to the minimum audio level by updating a stored silence level value in digital memory, performing, by the SFU, an action using the silence level and using packets communicated from the SFU toward client devices.

20 Claims, 5 Drawing Sheets

(56) References Cited

OTHER PUBLICATIONS

L. Marinov, "Jitsi-videobridge", published Jun. 1, 2014, https://github.com/jitsi/jitsi-videobridge/tree/975eeded7dc0c5e2d0ecfb47ec7a7490d1ff9d6f, 30pgs. (last accessed Mar. 10, 2016).

H. Schulzrinne et al, "RTP: A Transport Protocol for Real-Time Applications", Network Working Group, dated Jul. 2003, 94 pages.
H. Schulzrinne et al, "RTP Profile for Audio and Video Conferences with Minimal Control", Network Working Group, dated Jul. 2003, 40 pages.

* cited by examiner

EQUALIZATION OF SILENCE AUDIO LEVELS IN PACKET MEDIA CONFERENCING SYSTEMS

TECHNICAL FIELD

The present disclosure generally relates to improved methods, computer software and computer systems in the field of audio and/or video conferencing. The disclosure relates more specifically to improving the usability of real-time transport protocol (RTP) packet audio levels through determining client specific silence levels in Selective Forwarding Units (SFU).

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Video and/or audio calls and conferences are becoming both more common, and larger in size, every day. Originally, video and/or audio calls and conferences were limited to direct connections between users—a first user called a second user, enabling the users to see and hear each other during the call. As methods improved, conferences of five, ten, or more users all with streaming video and audio became more common. Simply sending all video and/or audio data from each participant to every other participant in a conference is not feasible, due to the limitations on bandwidth and processing power of most client devices.

Thus, solutions to large video and audio conferences were implemented using servers. The solutions fall into two general camps: multipoint control units (MCU) and selective forwarding units (SFU). MCUs receive and process audio and video data from clients, and typically mix the audio and video to create a single composite video. The composite video is then streamed to the clients in a single "mix." While this solution enables relatively simple client software, the processing power needed for the MCU is very demanding, and the resulting presentation at the client/participant is generally inflexible. SFUs, in contrast, are more similar to packet data routers, as SFUs forward packets without media processing. Improved methods that enable more effective and/or efficient video and/or audio conferences, without requiring large amounts of computing power, are needed.

DESCRIPTION OF EXAMPLE EMBODIMENTS

Figure 1:
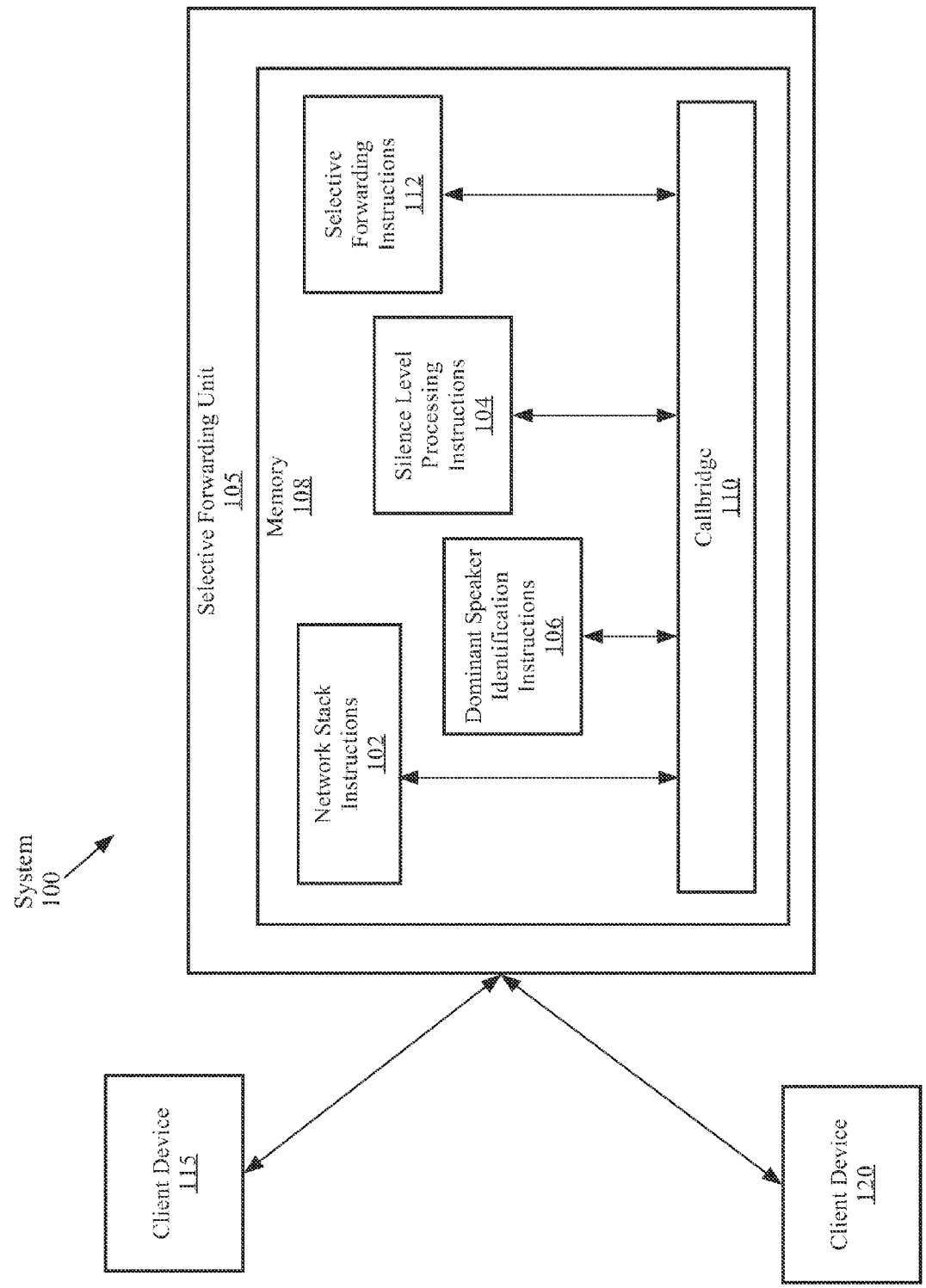
FIG. 1 illustrates a computer system programmed to perform conferencing in accordance with an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Computer-implemented techniques are provided for equalization of silence levels in real-time transport protocol (RTP) packet audio levels. Specifically, in various programmable algorithms, client-specific silence level values are maintained and updated over time, so that the silence level values for each client are equalized.

In one embodiment, a method includes receiving, at a selective forwarding unit (SFU), a first plurality of real-time transport protocol (RTP) packets corresponding to a first audio stream, wherein each of the first plurality of RTP packets comprise a header identifying an audio level of an audio sample carried in an associated RTP packet, equalizing, by the SFU, a first silence level of the first audio stream by: determining a first minimum audio level of the first audio stream over a first time period using the audio level from each of a first subset of the first plurality of RTP packets corresponding to the first time period, setting the first silence level for the first audio stream to the first minimum audio level, performing, by the SFU, an action using the first silence level. Other embodiments provide for systems and non-transitory computer readable media.

Overview of Related Technology and Terminology

Real-time Transport Protocol (RTP) is a network protocol used for delivering audio and/or video over Internet Protocol (IP) networks. RTP is a widely used standard, and is described in numerous Request for Comments (RFC) documents published by the Internet Society. This disclosure presumes access to, knowledge and understanding of RFC 3550, RFC 3551, and RFC 6464.

RFC 6464 describes that a header extension may be used in RTP packets to indicate an audio level of the audio sample carried in the associated RTP packet. The audio level contained in the header extension is represented as −dBov, which is the decibel value relative to the overload point of the system that is measuring the audio. Thus, a numerical value from 0 to 127 is used in the RTP header extension to represent decibel values 0 to −127. A value of 127 in the header extension would correspond to −127 dBov, and indicate a muted audio source, or no detected sounds. In contrast, a value of 0 in the header extension would represent the maximum audio level reportable by the system.

Using this header extension, a device receiving and/or processing RTP packets can determine audio levels of related audio streams without processing the audio data contained in the RTP packets, which can save substantial resources. The audio data contained in the RTP packets may be encoded and/or encrypted, or raw, or in any other format or state. However, at the same time, the data contained in the header is very limited as only a number from 0 to 127 may be represented, and performing actions based solely on this number is challenging. For example, deciding whether to forward a first or second audio stream to other conference participants based solely on the audio levels may appear straightforward; the system may be programmed to send the audio stream with the louder audio levels. However, because the audio level is defined using dBov, the audio levels reported in the RTP packets are relative to a system/participant-specific reference point, such as the overload point of the client audio capture device. Consequently, one client may report a dBov of −30, and another client may report a dBov of −50, and yet the second client may actually sound louder than the first client. As an example, the first client may be in a noisy coffee shop, with the dBov of −30 representing the baseline noise level and the client not contributing to the audio level. In other words, the first client is not speaking. However, the second client may be in a silent room and is speaking to create the audio level of −50. Ideally, the second client should be recognized as louder and/or more important than the first client. As another example, one client may have a very sensitive microphone that picks up the smallest sounds, while another client has a very insensitive microphone that does not pick up much sound. Accounting for these differences in silence levels is important to correctly perform actions based upon the dBov value received in the RTP header extension.

In the context of video or audio conferences, dominant speaker identification is the process of identifying a current dominant speaker in the conference. Typically, this is the person who is presenting or currently speaking in a conference. The dominant speaker may change during a conference, such as when a presenter takes questions from the audience. Dominant speaker identification may be performed in many different ways, but has historically relied on heavy processing of raw audio streams to determine whether human speech is present. By identifying a dominant speaker, useful actions may be taken. For example, the dominant speaker may be shown in the video display of the conference. Additionally, non-dominant video or audio streams may be given lower, or no, priority for forwarding to other clients, as there is no particular need to forward video or audio for a conference participant who is not speaking to other participants in the conference, for instance.

For convenience, this disclosure refers in different instances to video streams, audio streams, calls, or conferences. These terms may be used interchangeably and, if only one of the above terms is used in a description, then the description is intended to encompass all other such terms.

Example System Implementation

FIG. 1 illustrates an example computer system in which the techniques described may be practiced, according to one embodiment. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. System 100 illustrates only one of many possible arrangements of components configured to execute the programming described herein. Other arrangements may include fewer or different components, and the division of work between the components may vary depending on the arrangement.

System 100 includes selective forwarding unit (SFU) 105 and client devices 115, 120, which may be communicatively coupled directly or indirectly to the SFU via networks. SFU 105 may be any computing device, including but not limited to: servers, racks, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multiprocessor systems, microprocessor-based or programmable consumer electronics, game consoles, set-top boxes, network PCs, mini-computers, and the like. Although FIG. 1 shows SFU 105 as a single device, SFU 105 may be multiple devices, such as a server cluster, and may be located in one or more physical locations. As discussed above, a SFU forwards audio and/or video packets for a conference without media processing.

SFU 105 is communicatively connected to client devices 115, 120 through any kind of computer network using any combination of wired and/or wireless communication, including, but not limited to: a Local Area Network (LAN), a Wide Area Network (WAN), the Internet, a company network, etc. SFU 105 may include applications, software, and/or other executable instructions to facilitate various aspects of embodiments described herein. In one embodiment callbridge 110 comprises program instructions that are configured to receive RTP packets, determine minimum audio levels, maintain a silence level for each client, identify dominant speakers, selectively forward RTP packets based on a variety of factors, and/or any other functions needed to implement the present disclosure. In one embodiment, SFU 105 comprises network stack instructions 102, silence level processing instructions 104, and dominant speaker identification instructions 106, each coupled to a callbridge 110. The network stack instructions 102, silence level processing instructions 104, and dominant speaker identification instructions 106 are stored within electronic digital storage as indicated by main memory 108. Each of the network stack instructions 102, silence level processing instructions 104, and dominant speaker identification instructions 106 may comprise programmed machine executable instructions that are configured or programmed to implement and execute the algorithms that are further described herein, including in the flow diagrams and the text relating to those diagrams. In various embodiments, the network stack instructions 102, silence level processing instructions 104, and dominant speaker identification instructions 106 may be created and stored using a human-readable source code language and/or using a program development environment including but not limited to JAVA, OBJECTIVE-C, C++, C and the like.

Callbridge 110 may receive RTP packets from a network stack maintained in memory and coupled to an ingress network interface of the SFU 105, under control of the network stack instructions 102. Callbridge 110 may receive RTP packets from any number and type of clients. In an embodiment, the RTP packets received by callbridge 110 from client devices 115, 120 may utilize the header extension defined in RFC 6464, and therefore contain a dBov value for the audio level of the audio sample within the associated packet. In other embodiments, callbridge 110 may receive packets from client devices 115, 120 that use a media communication protocol other than RTP, and/or a means of carrying an audio level value through the protocol or through packets other than RFC 6464, and may perform operations that are functionally equivalent to those described herein for the embodiments that do use RTP and RFC 6464. Thus, not all embodiments will need an RTP processing capability and do not require conformance to RFC 6464.

In one embodiment, callbridge 110 comprises program instructions such as silence level processing instructions 104 that are programmed or configured to determine minimum audio level values ("levels") that may be stored digitally in memory. Specifically, a minimum audio level may be determined over one or more sequential time periods for each audio stream (i.e., for each client). The minimum audio level is determined using the dBov values contained in the RTP packet header extension. The time period over which a minimum audio level is determined may be any suitable amount of time, such as 5 seconds, 30 seconds, 1 minute, etc. The amount of time should be long enough for background noise to manifest itself in the packets. In other words, the amount of time should be long enough that, if the client is speaking, there will be multiple packets where the client pauses between words, takes a breath, or otherwise does not add additional noise to the background noise. The minimum audio level may be determined by comparing the audio values for the receive packets, and identifying the lowest audio level (i.e., the quietest). As soon as one time period is completed, a subsequent time period may begin, and a new minimum audio level may be determined for each audio stream received by callbridge 110. The minimum audio levels may be tracked for each time period for each client, and used in setting and maintaining a silence level for each client.

In one embodiment, callbridge 110 comprises program instructions such as silence level processing instructions 104 that are configured to maintain a silence level for each client. A silence level is a client specific audio level value, digitally stored in computer memory, which represents "silence" for that client. The silence level may be different for each client because the dBov value reported in the RTP packet header extension is relative, and clients may be in situations of varying noise levels. For example, consider two clients who are not speaking—they do not intend to transmit any sounds. However, the first client is in a completely silent room, while the second client is located in a room with the constant hum of an air conditioner. The silence level for the second client would include the hum of the air conditioner. In other words, if the hum of the air conditioner for the second client is a constant −110 dBov, then the silence level of the second client is −110 dBov, instead of absolute silence, or −127 dBov.

In one embodiment, maintaining a silence level for each client comprises updating the silence level value for that client as stored in digital memory. Once set by an initial time period, callbridge 110 may update the silence level for clients based on subsequent time periods. The silence level may be updated by averaging the current silence level with a newly generated minimum audio level, such as by using a geometric mean. Alternatively, the silence level may be overwritten with a newly generated minimum audio level from a subsequent time period. The silence level may be updated because the silence level of the client may change, and could result in inadvertently ignoring actions of the client, such as speaking. For example, if a client begins a videoconference in a noisy room, the silence level may be relatively loud. Then, when the client moves to a very quiet room, if the silence level is not updated from the "relatively loud" amount, the client may need to yell to be able to speak in the conference. Likewise, if the client were to move from a very quiet room to a loud room, the client may accidentally be deemed to be speaking or otherwise attempting to contribute to the conference.

Once the silence level value is determined, the silence level may be used by callbridge 110, or other suitable application or process, to signal other devices or to perform or improve the performance of a variety of actions. Specifically, the silence levels may be used by callbridge 110 or other suitable application or process to impact the behavior of client devices 115, 120. For example, the SFU 105 may drop packets that contain audio below the associated silence level. These packets are thus not forwarded to clients that are participating in an audio conference or videoconference, and result in better usage of bandwidth for the clients. These packets may safely be dropped without a loss of information to the clients because the packets are deemed to contain absolute silence, and therefore there is no need to forward them to other clients as they contain no important audio.

As another example, the process of dominant speaker identification may be improved by using the silence levels of audio streams to equalize the volume between streams, resulting in a more meaningful comparison of volume between streams and, therefore, resulting in more accurate determinations of who the dominant speaker is and more accurate switching of video images or other signaling to show the then-current speaker in a videoconference. Once identified using, in part, the silence levels, callbridge 110 may send a notification to client devices 115, 120 to display the dominant speaker in a prominent location in a videoconference, turn up the audio associated with the dominant speaker, or take any other action. Optionally, client devices 115, 120 may begin to receive a new audio or video stream in response to the dominant speaker being identified.

In one embodiment, callbridge 110 comprises program instructions such as dominant speaker identification instructions 106 that are configured to identify dominant speakers. Specifically, callbridge 110 identifies dominant speakers using only the dBov audio levels contained in the RTP packet header extension, and the silence level for the corresponding audio stream(s). Callbridge 110 identifies dominant speakers in a two step process: a local processing step, and a global decision step. In the local processing step, audio levels in the RTP packet header extensions from each audio stream are processed independently over short, medium, and long intervals to generate speech activity scores. The short intervals may be long enough to capture a few phonemes, such as 0.1 seconds, 0.5 seconds, etc. The medium interval may be long enough to capture a few words, such as 1 seconds, 3 seconds, etc. The long interval may be long enough to capture a short sentence, such as 4 seconds, 8 seconds, etc. The short, medium, and long intervals may be of any suitable length, and should not be limited to the above examples.

In one embodiment, the medium interval may be comprised of 2, 3, or more short intervals, and the long interval may be comprised of 2, 3, or more medium intervals. In this embodiment, the results of the speech activity calculations for the short intervals are used in generating the speech activity scores for the medium intervals, and the results of the speech activity calculations for the medium intervals are used in generating the speech activity scores for the long intervals. Specifically, callbridge 110 may break the dBov values down into sub-bands (such as a sub-band for each interval of 20 dBov, etc.), and using the sub-bands, determine whether there is a likelihood of speech presence or a likelihood of speech absence. The speech activity scores reflect these likelihoods. Additionally, callbridge 110 uses the previously determined silence levels as thresholding to equalize the relative loudness of the background noise present in the audio signals of the clients. In one embodiment, the silence levels are used as a simple threshold—any values at or below the silence level are deemed to be silence, and are ignored. Optionally, the silence level may be used to reduce the audio level reported in the packet, either by the amount of the silence level or some portion of the silence level, to result in a reduced audio level that more accurately reflects the volume of the speech occurring over the background noise.

In one embodiment, the second step of the two step process is a global processing step. In the global processing step, callbridge 110 determines whether the speech activity scores of a competing (i.e., not the current dominant speaker) audio stream indicate that there is a new dominant speaker. If so, then the dominant speaker switches. When the dominant speaker switches, callbridge 110 may take any suitable action, such as beginning to forward video and/or audio related to the new dominant speaker to all conference participants, sending instructions to the clients to display video of the new dominant speaker in a prominent area, etc. If there is not a dominant speaker switch, then the dominant speaker continues unchanged.

In one embodiment, callbridge 110 comprises program instructions such as selective forwarding instructions 112 that are configured to selectively forward RTP packets from SFU 105 to conference participants such as client devices 115, 120 based on factors such as the speech activity scores from the dominant speaker identification, discussed above, to identify a set number of audio and/or video streams for forwarding on to all conference participants. The number of streams forwarded to conference participants may vary dynamically during the conference. In one embodiment, silence levels may be used to identify packets to drop, as packets that are reporting silence need not be transmitted to participants. In this manner, the selective forwarding instructions 112 may cause the SFU 105 to selectively forward, or not forward, packets received on an ingress interface to an egress interface and onward toward the client devices 115, 120.

For purposes of illustrating a clear example, FIG. 1 shows two client devices 115, 120, but in other embodiments, any number of client devices may be used and the embodiments herein specifically contemplate interoperation with thousands or millions of client devices with dozens or more client devices participating in any one audio conference or videoconference. In one embodiment, the client devices 115, 120 are computing devices, including but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, servers, racks, and the like.

Client devices 115, 120 are communicatively connected to SFU 105 using any combination of wired and/or wireless communication as represented by the arrows in FIG. 1, including, but not limited to: a Local Area Network (LAN), a Wide Area Network (WAN), the Internet, a company network, etc. Client devices 115, 120 may include applications, software, and/or other executable instructions to facilitate various aspects of embodiments described herein. Specifically, client devices 115, 120 may include client software that is programmed to support videoconferencing or audio conferencing. The software may be standalone, may be implemented through a web browser using browser-executable code, or any other suitable application. In one embodiment, the software used by client devices 115, 120 for video and/or audio conferencing utilizes RFC 6464 to insert audio values into the RTP packet header extensions.

Example Functional Implementation

Equalization of Silence Levels

Figure 2:
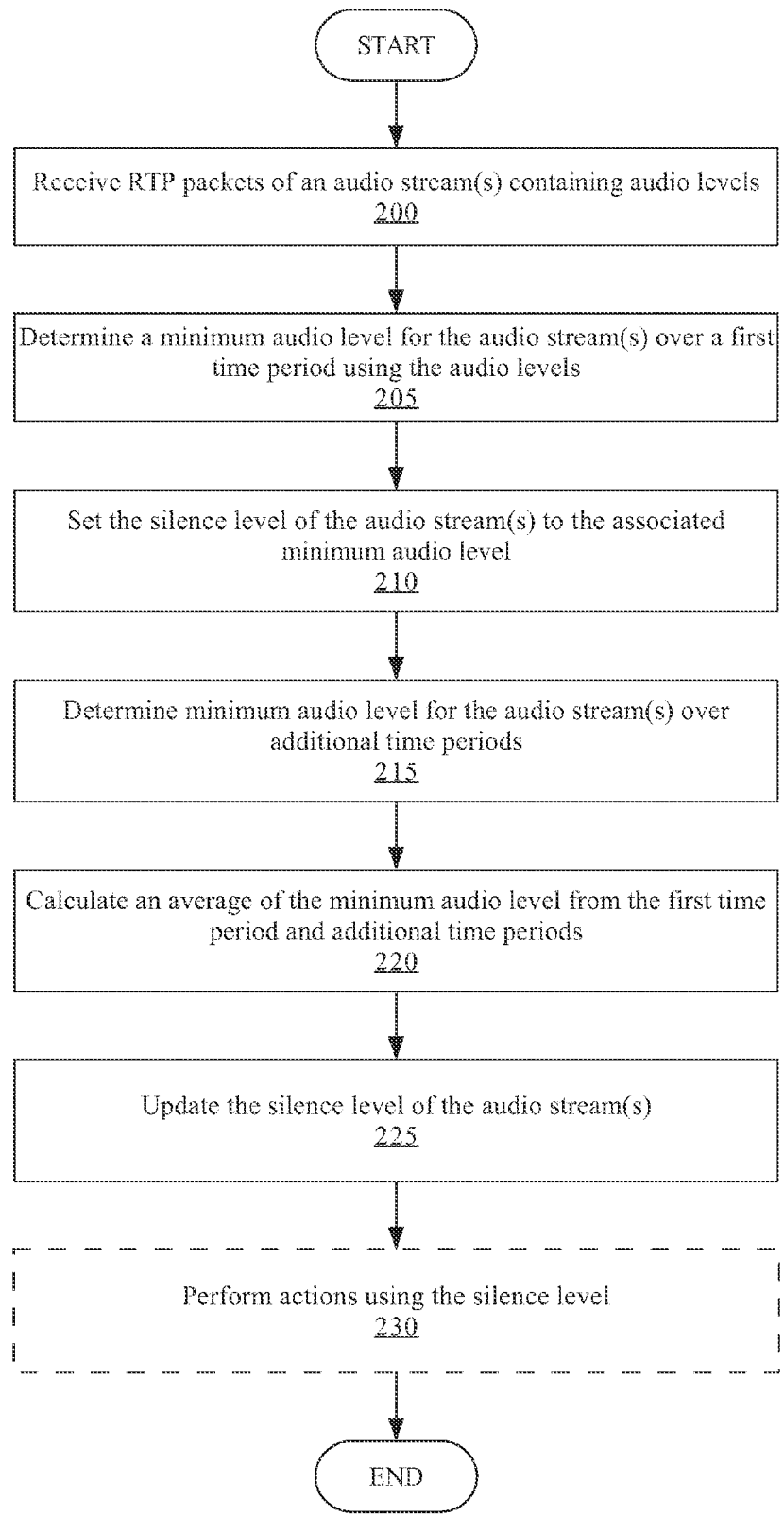
FIG. 2 illustrates a programmable algorithm or method in accordance with an embodiment.

FIG. 2 illustrates an example programmable algorithm or method for equalization of silence levels. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

In step 200, RTP packets of audio streams containing audio levels are received. The RTP packets may be received in any manner, and may be received from any number of clients. Specifically, the RTP packets include a header extension that indicates an audio level for the audio sample contained within the packet. The audio level is a –dBov value from 0 to 127.

In step 205, minimum audio levels are determined for the audio streams over a first time period using the audio levels. The minimum audio levels are determined for each individual client. The minimum audio levels may be determined in any suitable manner. The first time period may be any length of time, such as 5 seconds, 10 seconds, 30 seconds, etc. Any number of packets may be included in the length of time over which the minimum audio levels are determined.

In step 210, the silence level of each audio stream is set to the associated minimum audio level. The silence level represents the volume of the background noise for the associated client. In other words, the silence level is used to help separate the signal (e.g., speech) from the noise (e.g., background noise) when the only information available is a numerical value from 0 to 127.

In step 215, the minimum audio level for the audio streams is determined over additional time periods. The additional time periods may occur immediately after the first time period, or there may be some time in between the end of the first period and the beginning of additional periods of time. Specifically, steps 205, 210, and 215 may occur continuously, such that for all audio streams, a minimum audio value for a time period is constantly being determined. These minimum audio values may then be used to update the silence level in step 220. In one embodiment, the length of the additional time periods is constant. Alternatively, the length of the additional time periods may change, such as gradually increasing in length, etc.

In step 220, an average of the minimum audio levels is calculated from the first time period and additional time periods. As each additional time period ends, the minimum audio level from the additional time period may immediately be averaged or otherwise combined, with the existing silence level, or the prior minimum audio levels. In one embodiment, a geometric mean is used to allow the silence level to gradually adjust over time. However, the minimum audio levels may be combined in any suitable manner. Optionally, a window function or other method may be used to exclude old minimum audio levels. For example, only the 3 most recent minimum audio levels may be considered.

In step 225, the silence levels of the audio streams are updated to the associated average of the minimum audio levels. The silence level of each audio stream may be updated in any suitable manner using, for example, the averages discussed in step 220.

In step 230, actions are performed using, in part, the silence level to equalize the audio levels. Any actions may be performed using, in part, the silence levels. For example, a SFU may use the silence level of a client to determine when to drop audio packets. In other words, if the audio level indicated in a RTP packet is at or below (or even slightly above) the determined silence level for a given client, the packets may safely be dropped as they contain only silence. As another example, the silence level may be used to equalize the audio levels of multiple clients competing to be the dominant speaker in a conference. By removing the background noise from each client, a more accurate comparison of the volume of the speech of each client may be made, resulting in a more accurate identification of who the dominant speaker is. As indicated by the dotted line, step 230 may optionally be performed by a different application or method than was used to determine the silence level. Alternatively, the same application or method used to determine the silence level may also perform the action(s).

Example Functional Implementation

Dominant Speaker Identification with Equalization of Silence Levels

Figure 3:
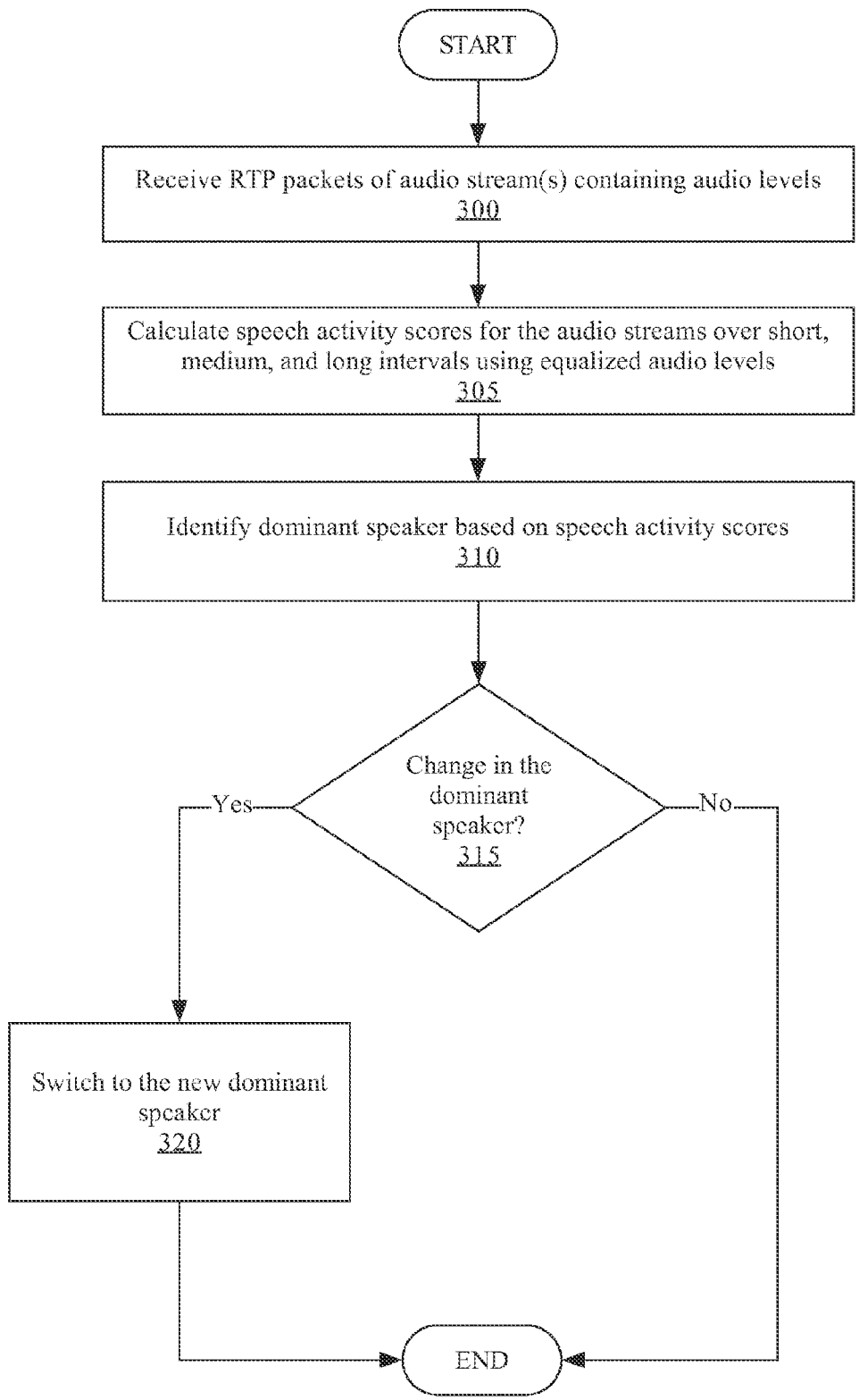
FIG. 3 illustrates a programmable algorithm or method in accordance with another embodiment.

FIG. 3 shows an example flowchart of a method for equalization of silence levels. Specifically, FIG. 3 shows an example flowchart of dominant speaker identification with equalization of silence levels. Although the steps in FIG. 3 are shown in an order, the steps of FIG. 3 may be performed in any order, and are not limited to the order shown in FIG. 3. Additionally, some steps may be optional, may be performed multiple times, and/or may be performed by different components.

In step 300, RTP packets of audio streams are received that contain audio levels. The RTP packets may be received in any manner, and may be received from any number of clients. Specifically, the RTP packets include a header extension that indicates an audio level for the audio sample contained within the packet. The audio level is a −dBov value from 0 to 127.

In step 305, speech activity scores for the audio streams are calculated over short, medium, and long intervals using equalized silence audio levels. The speech activity scores reflect the likelihood of the interval containing speech. The speech activity scores may be calculated in any suitable manner. Specifically, the speech activity scores are calculated without analyzing the raw audio data. In other words, the speech activity scores are calculated using only the audio levels from the RTP packet header extensions, and the silence level for each client (which was also calculated from only the audio level in the RTP packet header extension). In one embodiment, the speech activity scores calculated for the short interval are components in calculating the speech activity scores for the medium interval, and the speech activity scores calculated for the medium intervals are components in calculating the speech activity scores for the long interval. The speech activity scores are based, at least in part, on how loud the audio levels of the RTP packet header extensions are. When calculating the speech activity scores, any audio level less than the silence level for a given client is deemed to be absolute silence. In this way, the silence levels for different clients may be accounted for, resulting in substantially more accurate speech activity scores and, ultimately, a better identification of the dominant speaker.

In step 310, a dominant speaker is identified based on the speech activity scores. The dominant speaker may be identified in any suitable manner. For example, a comparison of the speech activity scores may be made. Optionally, thresholding, or other factors, may be applied to either the current dominant speaker or client challenging the dominant speaker. For example, a client challenging the dominant speaker may need to exceed the speech activity scores of the dominant speaker by ten percent to be identified as the new dominant speaker.

In step 315, a determination is made whether there is a change in the dominant speaker. If there has not been a change, the method ends. If there has been a change then the method proceeds to step 320.

In step 320, a switch is made to the new dominant speaker. The switch may involve any suitable action, such as beginning to forward audio and video associated with the new dominant speaker to the conference participants and/or stopping forwarding of audio or video associated with the prior dominant speaker. Alternatively, the switch may involve sending a signal to the conference participants to display video of the new dominant speaker in a prominent location on the conference participant's screens, and moving the prior dominant speaker to a less prominent location on the conference participant's screens. Additionally, any other suitable action(s) may be taken.

Example Silence Level Values

Figure 4:
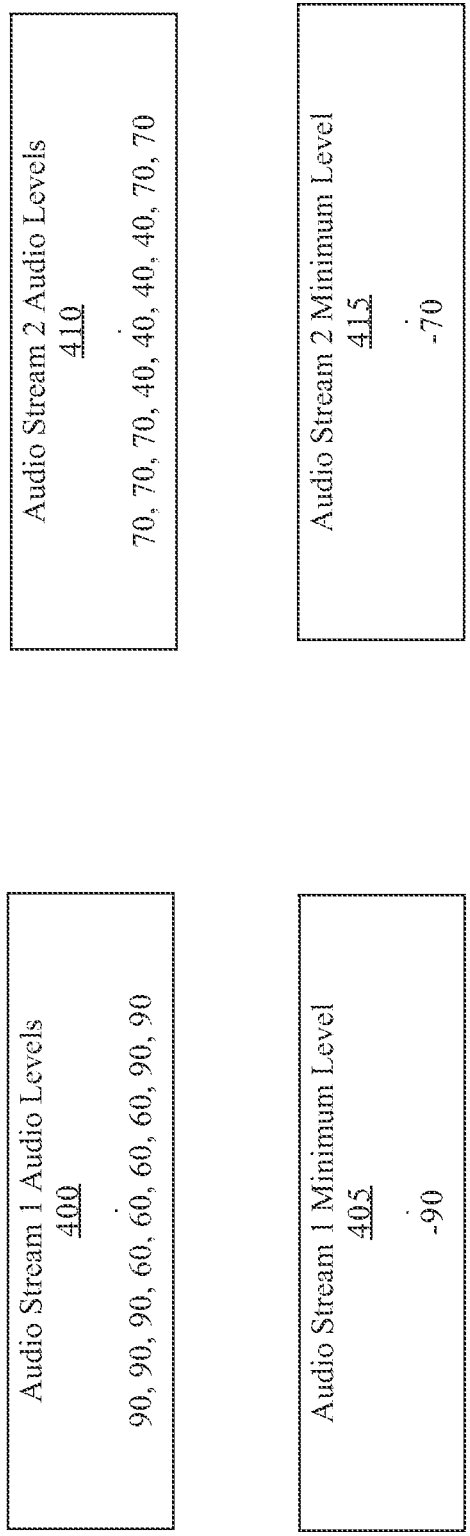
FIG. 4 illustrates an example of audio level values and minimum level values in accordance with an embodiment.

FIG. 4 illustrates an example of audio level values and minimum level values in accordance with an embodiment. The example shown in FIG. 4 has been simplified for purposes of clarity, and is intended as just one example and not to limit the disclosure to the specifics disclosed herein.

FIG. 4 shows a first audio stream having audio levels 400, which are contained in the header extensions of nine different RTP packets. The audio levels are "90 90 90 60 60 60 60 90 90." From these audio levels, the minimum audio level can be identified. For the purposes of this example, the time period over which the minimum audio level will be determined is the nine packets shown in audio stream 1 audio levels 400. In determining the minimum audio level, the result will be −90 because, in the RTP packet header extension, the audio levels are represented as −dBov. Thus, the minimum level 405 of the first audio stream is "−90." Initially, the silence level for the first audio stream is set to this minimum audio level. If subsequent minimum audio levels were determined for the first audio stream, the silence level may be updated to reflect any changes.

FIG. 4 also shows a second audio stream having audio levels 410, which are contained in the header extensions of nine different RTP packets, which are separate packets from the RTP packets of the first audio stream. However, the RTP packets used for the second audio stream are received at roughly similar timing relative to the RTP packets for the first audio stream, because the two clients are in the same videoconference. The audio levels are "70 70 70 40 40 40 40 70 70." From these audio levels, the minimum audio level can be identified. For the purposes of this example, the time period over which the minimum audio level will be determined is the nine packets shown in the audio levels 410 of the second audio stream. In determining the minimum audio level, the result will be −70 because, in the RTP packet header extension, the audio levels are represented as −dBov. Thus, the second audio stream minimum level 415 is "−70." Initially, the silence level for the second audio stream is set to this minimum audio level. If subsequent minimum audio levels were determined for the second audio stream, then the silence level may be updated to reflect any changes.

Once the silence levels for the first and second audio steams have been determined, actions may be taken using the silence levels. As one action, an SFU may use the silence levels to automatically drop packets containing silence. Thus, a new packet from the first audio stream with an audio level of 91 would be automatically dropped by the SFU, and not forwarded to any other participants in a conference. Similarly, a new packet from the second audio stream with an audio level of 71 would be automatically dropped by the SFU, and not forwarded to any other participants in a conference.

The above disclosed algorithms may have many different external physical effects on the end users of client devices. For example, when the SFU drops packets based on the silence level, the client devices receive fewer low value audio packets (such as audio packets containing silence or mere background noise), resulting in a better usage of client device's potentially limited bandwidth and processing power. As another example, with a more accurate determination of the dominant speaker of a conference, the end user's conference experience is improved, with less switching between different speakers. This also improves the client device's bandwidth usage and processing power usage.

Additionally, the use of a silence level is not well-understood, routine, or conventional within the field. Conventional identification of speech, whether for dropping packets, identifying a dominant speaker, or other use, relies on processing raw audio files. Obviously, raw audio files provide many order of magnitudes more information. To achieve workable results with only a number from 0 to 127 as input, many additional improvements that are unconventional needed to be made, such as the use of silence levels.

Implementation Example

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
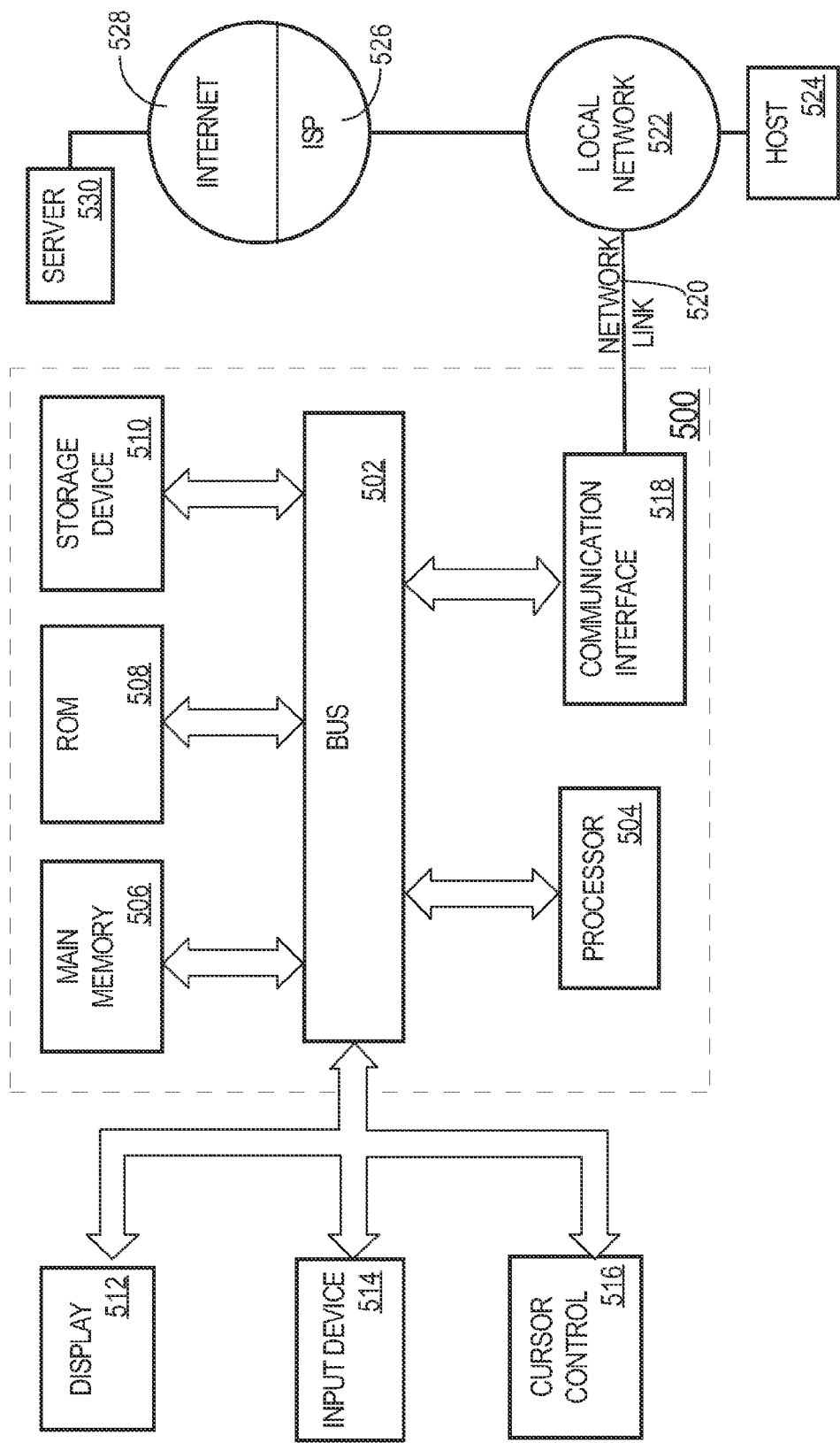
FIG. 5 illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving, at a selective forwarding unit (SFU), a first plurality of media protocol packets corresponding to a first audio stream from a client device, wherein each particular media protocol packet of the first plurality of media protocol packets comprises a packet header comprising an audio level value identifying an audio level of an audio sample that is carried in that particular media protocol packet;
    equalizing, by the SFU, a first silence level of the first audio stream by:
        determining a first minimum audio level of the first audio stream over a first time period using only the audio level from the packet header of each of a first subset of the first plurality of media protocol packets corresponding to the first time period;
        setting the first silence level for the first audio stream to the first minimum audio level by updating a stored first silence level value in digital memory;
    performing, by the SFU, an action using the stored first silence level and using one or more packets from the client device, wherein the one or more packets are communicated from the SFU toward one or more other client devices.

2. The method of claim 1, further comprising:
    determining a second minimum volume of the first audio stream over a second time period using the audio level from each of a second subset of the first plurality of media protocol packets corresponding to the second time period;
    calculating an average value of the first minimum audio level and the second minimum audio level;
    setting the first silence level for the first audio stream to the average value.

3. The method of claim 2, wherein the average value is a geometric mean.

4. The method of claim 1, further comprising receiving, at the SFU, the first plurality of media protocol packets as real-time transport (RTP) protocol packets in which the audio level value comprises a decibel value relative to an overload point of one of the client devices that measured audio at that client device.

5. The method of claim 1, further comprising receiving, at the SFU, the first plurality of media protocol packets as real-time transport (RTP) protocol packets in which the audio level value comprises a dBov value in conformance with RFC 6464.

6. The method of claim 1, further comprising performing, as the action by the SFU, identifying a new dominant speaker in a conference and instructing a callbridge unit of the SFU to begin forwarding video or audio packets associated with the new dominant speaker to conference participants.

7. The method of claim 1, further comprising performing, as the action by the SFU, dropping a particular media protocol packet that is associated with the first audio stream and which comprises an audio level that is less than the first silence level.

8. The method of claim 1, further comprising:
    receiving, at the SFU, a second plurality of media protocol packets corresponding to a second audio stream, wherein each of the second plurality of media protocol packets comprise a header identifying an audio level of an audio sample carried in an associated media protocol packet;
    equalizing, by the SFU, a second silence level of the second audio stream by:
    determining a third minimum audio level of the second audio stream over the first time period using the audio level from each of a third subset of the second plurality of media protocol packets corresponding to the first time period;
    setting the second silence level for the second audio stream to the third minimum audio level;
    performing, by the SFU, using the audio levels of the first audio stream and the second audio stream after equalizing using the first silence level and the second silence level, dominant speaker identification between the first audio stream and second audio stream.

9. One or more non-transitory computer-readable media storing one or more programs, the one or more programs comprising instructions which, when executed by one or more processor cause:
    receiving a first plurality of media protocol packets corresponding to a first audio stream from a client device, wherein each particular media protocol packet of the first plurality of media protocol packets comprises a packet header comprising an audio level value identifying an audio level of an audio sample that is carried in that particular media protocol packet;

equalizing a first silence level of the first audio stream by:
determining a first minimum audio level of the first audio stream over a first time period using only the audio level from the packet header of each of a first subset of the first plurality of media protocol packets corresponding to the first time period;
setting the first silence level for the first audio stream to the first minimum audio level by updating a stored first silence level value in digital memory;
performing an action using the stored first silence level and using one or more packets from the client device, wherein the one or more packets are communicated toward one or more other client devices.

10. The one or more non-transitory computer readable media of claim 9, the instructions, when executed, further cause:
determining a second minimum volume of the first audio stream over a second time period using the audio level from each of a second subset of the first plurality of media protocol packets corresponding to the second time period;
calculating an average value of the first minimum audio level and the second minimum audio level;
setting the first silence level for the first audio stream to the average value.

11. The one or more non-transitory computer readable media of claim 10, wherein the average value is a geometric mean.

12. The one or more non-transitory computer readable media of claim 9, the instructions, when executed further cause:
receiving the first plurality of media protocol packets as real-time transport (RTP) protocol packets in which the audio level value comprises a dBov value in conformance with RFC 6464.

13. The one or more non-transitory computer readable media of claim 9, the instructions, when executed, further cause:
performing, as the action, identifying a new dominant speaker in a conference and instructing a callbridge unit to begin forwarding video or audio packets associated with the new dominant speaker to conference participants.

14. The one or more non-transitory computer readable media of claim 9, the instructions, when executed, further cause:
receiving a second plurality of media protocol packets corresponding to a second audio stream, wherein each of the second plurality of media protocol packets comprise a header identifying an audio level of an audio sample carried in an associated media protocol packet;
equalizing a second silence level of the second audio stream by:
determining a third minimum audio level of the second audio stream over the first time period using the audio level from each of a third subset of the second plurality of media protocol packets corresponding to the first time period;
setting the second silence level for the second audio stream to the third minimum audio level;
performing using the audio levels of the first audio stream and the second audio stream after equalizing using the first silence level and the second silence level, dominant speaker identification between the first audio stream and second audio stream.

15. A system comprising:
a selective forwarding unit (SFU) comprising a memory, one or more processors, and one or more programs stored in the memory and configured for execution by the one or more processors, the one or more programs comprising instructions which, when executed, cause:
receiving a first plurality of media protocol packets corresponding to a first audio stream from a client device, wherein each particular media protocol packet of the first plurality of media protocol packets comprises a packet header comprising an audio level value identifying an audio level of an audio sample that is carried in that particular media protocol packet;
equalizing a first silence level of the first audio stream by:
determining a first minimum audio level of the first audio stream over a first time period using only the audio level from the packet header of each of a first subset of the first plurality of media protocol packets corresponding to the first time period;
setting the first silence level for the first audio stream to the first minimum audio level by updating a stored first silence level value in digital memory;
performing an action using the first silence level and using one or more packets from the client device, wherein the one or more packets are communicated toward one or more other client devices;
the client device comprising a memory, one or more processors, and one or more programs stored in the memory and configured for execution by the one or more processors, the one or more programs comprising instructions which, when executed, cause:
sending the first plurality of RTP packets.

16. The system of claim 15, the instructions of the one or more programs of the SFU, when executed, further cause:
determining a second minimum volume of the first audio stream over a second time period using the audio level from each of a second subset of the first plurality of media protocol packets corresponding to the second time period;
calculating an average value of the first minimum audio level and the second minimum audio level;
setting the first silence level for the first audio stream to the average value.

17. The system of claim 16, wherein the average value is a geometric mean.

18. The system of claim 15, the instructions of the one or more programs of the SFU, when executed, further cause:
receiving the first plurality of media protocol packets as real-time transport (RTP) protocol packets in which the audio level value comprises a dBov value in conformance with RFC 6464.

19. The system of claim 15, the instructions of the one or more programs of the SFU, when executed, further cause:
performing, as the action, identifying a new dominant speaker in a conference and instructing a callbridge unit of the SFU to begin forwarding video or audio packets associated with the new dominant speaker to conference participants.

20. The system of claim 15, the instructions of the one or more programs of the SFU, when executed, further cause:
receiving a second plurality of media protocol packets corresponding to a second audio stream, wherein each of the second plurality of media protocol packets comprise a header identifying an audio level of an audio sample carried in an associated media protocol packet;

equalizing a second silence level of the second audio stream by:

determining a third minimum audio level of the second audio stream over the first time period using the audio level from each of a third subset of the second plurality of media protocol packets corresponding to the first time period;

setting the second silence level for the second audio stream to the third minimum audio level;

performing using the audio levels of the first audio stream and the second audio stream after equalizing using the first silence level and the second silence level, dominant speaker identification between the first audio stream and second audio stream.

* * * * *